United States Patent [19]

Calkins

[11] 4,021,975
[45] May 10, 1977

[54] PET HOUSE

[76] Inventor: William W. Calkins, 610 S. Olive, La Habra, Calif. 90631

[22] Filed: Apr. 2, 1976

[21] Appl. No.: 668,184

[52] U.S. Cl. .................................. 52/64; 119/19
[51] Int. Cl.² .................................... A01K 1/00
[58] Field of Search ........... 52/64, 69; 49/169, 171; 119/1, 19; 160/180, 181

[56] References Cited

UNITED STATES PATENTS

| 2,795,208 | 6/1957 | Rasmussen | 119/19 X |
| 2,932,279 | 4/1960 | Giles | 119/19 X |
| 3,434,253 | 3/1969 | Hatcher | 52/69 |
| 3,618,568 | 11/1971 | Breeden | 119/1 X |
| 3,667,172 | 6/1972 | Erickson | 52/64 |
| 3,690,299 | 9/1972 | Johnson | 49/169 X |

Primary Examiner—J. Karl Bell
Attorney, Agent, or Firm—Edgar W. Averill, Jr.

[57] ABSTRACT

A pet house connected to the interior of a residence by a tunnel containing a vapor impervious barrier. The major portion of the pet house is located outside of the residence and contains a litter box together with ventilation means. The pet house may be opened from the outside of the residence for cleaning.

4 Claims, 3 Drawing Figures

U.S. Patent  May 10, 1977  4,021,975
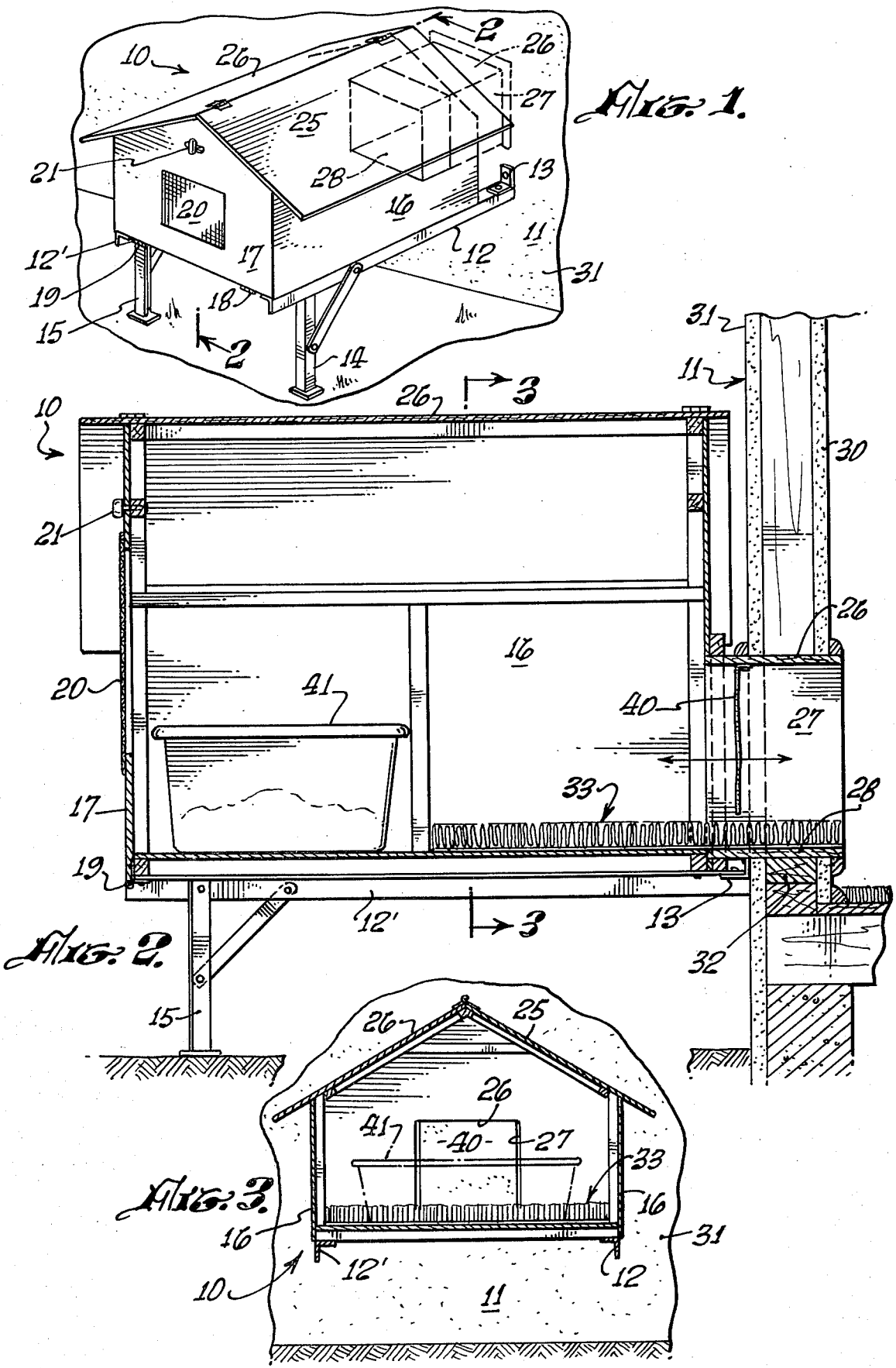

PET HOUSE

BACKGROUND OF THE INVENTION

The invention relates to pet houses and more specifically relates to pet houses which allow a pet to enter and leave residence without assistance. The problem of litter box odors has received considerable attention and various approaches have been taken to reduce this problem for household pets such as cats. Chlorophyll containing litter box fillers have been used as has alfalfa-containing products for the purpose of reducing odors. Absorbant clays and various odor maskants have also found wide use but none of these approaches has solved the problem. In the past the only sure way of eliminating odor was to let the pet out of the house, but this is often impractical.

SUMMARY OF THE INVENTION

The present invention is for a pet house useful for eliminating the odors eminating from a litter box while allowing the litter box to be accessible to the pet from within the house. The pet house has an entry way tunnel which has its first end in the wall of a residential building, apartment house or the like. The tunnel is sealed to the inner wall of the house as well as to the outer wall of the house and extends beyond the outer wall and connects to a pet house which is held at an appropriate height from the ground so that the tunnel enters the house near the floor thereof. The tunnel contains a vapor impervious barrier which is hinged or otherwise moveable to permit a pet to pass through the tunnel. The pet house is weather-proof and ventilated and has means for opening to permit the removal, cleaning and replacing of the litter box contained with the pet house.

BRIEF DESCRIPTION OF THE DRAWINGS

FIG. 1 is a perspective view of the pet house of the present invention.

FIG. 2 is an enlarged cross-sectional view taken along line 2—2 of FIG. 1.

FIG. 3 is a cross-sectional view taken along line 3—3 of FIG. 2.

DESCRIPTION OF THE PREFERRED EMBODIMENTS

The pet house of the present invention is shown in perspective view in FIG. 1 and indicated generally by reference character 10. The exterior wall of the house is indicated by reference character 11. The pet house is supported by angle irons 12 and 12' which are bolted to the exterior wall of the house by brackets such as that shown at 13. The angle irons are supported by legs 14 and 14 which perferably are set on a concrete slab or other support member.

The house has a side wall 16 and an end wall 17. End wall 17 is hinged to the floor of the pet house by hinges 18 and 19. A wire mesh window 20 is located in end wall 17. A latch 21 holds end wall 17 in the closed position. The roof has two surfaces 25 and 26. Roof surface 25 is hinged to roof surface 26 to permit an alternate method of entry into the pet house for cleaning of the same.

A tunnel roof 26 extends from the inside of the residence to the inside of the pet house. A tunnel wall 27, a tunnel floor and an opposite wall enclose the tunnel.

Turning now to FIG. 2, the attachment of the tunnel to the residence is shown more clearly. In installing the pet house, a hole is first cut through the inside wall of the house 30 and through the outside wall 31. The hole should of course be located above the floor plate 32. The tunnel floor 28 rests on floor plate 32. The tunnel may be carpeted with carpeting 33.

A vapor impervious barrier 40 is affixed to roof 26 of the tunnel. The barrier may be a square of carpeting, flexible vinyl, flexible rubber, or the like. Although it is not necessary for the barrier to be air tight, it should be sufficiently immpervious so that it reduces or elminates any breeze from flowing into the house.

A litter box 41 is located on the floor of the rear of the pet house and may be readily reached by opening end wall 21 or alternatively by opening roof surface 25.

The cross-sectional view of FIG. 3 depicts the opening of roof surface 25 for litter box removal.

The exterior surfaces of the pet house should, of course, be waterproof, painted or otherwise protected from the weather. The pet house can also provide a place of seclusion for the pet in the event the pet is bothered by small children while at the same time the house protects the pet from other animals outside.

Appropriate dimensions for a pet house useful for cats has been found to comprise a house having a floor 28 inches long and 18 inches wide, a wall height of 12 inches and a height of the roof from the floor of 18 inches. 1½ inch angle iron has been found satisfactory to support the house. The floor of the pet house may be ⅝ inch plywood while ¼ inch exterior plywood is satisfactory for the walls and roof. The tunnel should be caulked and weatherproofed at both the interior entrance and exterior intersection between the outerwall and the inner surface of the tunnel. It is preferable that the legs of the pet house be set on cement so that they do not tend to sink into the ground. The tunnel size may vary but is has been found that a 10 inch square tunnel is satisfactory.

In use, it has been found that the use of the pet house present invention has eliminated cat litter box odor from within the house. Also, it has been found that cats tend to spend a substantial amount of time within the area of the pet house which is indicated by reference character 33.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. A pet house useful for freeing a residence from the odors eminating from a litter box while allowing the litter box to be accessible to a pet from within the residence, said pet house comprising:
   an entry way tunnel having a first end within a residential building and being held in weather tight connection therewith, the lower surface of the tunnel being near the floor of the residential building;
   a vapor impervious barrier located within said tunnel, said barrier being hinged to permit a pet to pass through said tunnel;
   a weatherproof, ventilated and enclosed pet house affixed to the other end of said tunnel;
   a litter box within said pet house; and means for opening said pet house to permit the removal, cleaning and replacing of said litter box.

2. The pet house of claim 1 wherein said vapor impervious barrier is a flexible sheet affixed to the upper surface of said tunnel and extending to the floor of said tunnel.

3. The pet house of claim 1 wherein said pet house has four walls and the wall located farthest from the house is hinged along its bottom edge to permit the house to be opened for cleaning.

4. The pet house of claim 1 wherein at least one surface of said roof is hinged to permit the opening thereof to provide access to said litter box.

* * * * *